US009346459B2

(12) United States Patent
Munsell et al.

(10) Patent No.: US 9,346,459 B2
(45) Date of Patent: May 24, 2016

(54) UTILITY VEHICLE WITH PARALLEL OPERATED INTERNAL COMBUSTION ENGINE AND ELECTRIC MOTOR DRIVETRAINS

(71) Applicant: Textron, Inc., Providence, RI (US)

(72) Inventors: Trenton Munsell, Augusta, GA (US); Christopher K. Furman, North Augusta, SC (US); Patrick Warden, Grovetown, GA (US); Bradley Skaggs, Augusta, GA (US); John Chatfield, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 14/657,689

(22) Filed: Mar. 13, 2015

(65) Prior Publication Data

US 2015/0183417 A1    Jul. 2, 2015

Related U.S. Application Data

(62) Division of application No. 13/405,805, filed on Feb. 27, 2012, now Pat. No. 9,014,887.

(60) Provisional application No. 61/588,880, filed on Jan. 20, 2012.

(51) Int. Cl.
*G06F 7/00* (2006.01)
*B60W 20/00* (2016.01)
*B60K 6/36* (2007.10)
*B60K 6/448* (2007.10)
*B60K 6/48* (2007.10)
*B60K 6/52* (2007.10)
*B60K 26/04* (2006.01)

(Continued)

(52) U.S. Cl.
CPC ............. *B60W 20/10* (2013.01); *B60K 6/36* (2013.01); *B60K 6/448* (2013.01); *B60K 6/48* (2013.01);

(Continued)

(58) Field of Classification Search
CPC ...... B60W 20/10; B60W 10/06; B60W 10/08; B60W 10/10; B60K 6/36; B60K 6/448; B60K 6/48; B60K 6/52; B60K 17/354; B60K 26/04
USPC .......................................... 700/22
See application file for complete search history.

(56) References Cited

U.S. PATENT DOCUMENTS 4,487,302 A    12/1984 Morimoto et al.
5,713,425 A *   2/1998 Buschhaus ............... B60K 6/36
                                                    180/297

(Continued)

FOREIGN PATENT DOCUMENTS

EP            2127984 A1    12/2009

OTHER PUBLICATIONS

NPL:Torque Converter; Date:N/A.*

(Continued)

*Primary Examiner* — Ian Jen
(74) *Attorney, Agent, or Firm* — Polster Lieder

(57) ABSTRACT

A utility vehicle includes a first axle, a second axle, an electric motor, an internal combustion engine, and a torque transfer device. The first axle is coupled to first and second wheels. The second axle is coupled to third and fourth wheels. The electric motor drives the first axle in a first direction and a second direction at different times. The internal combustion engine drives a transmission output shaft in one direction. The torque transfer device selectively drives the second axle in the first direction in response to rotation of the transmission output shaft in the one direction. The torque transfer device also selectively drives the second axle in the second direction in response to rotation of the transmission output shaft in the one direction.

8 Claims, 2 Drawing Sheets

(51) Int. Cl.
  *B60W 10/06* (2006.01)
  *B60W 10/08* (2006.01)
  *B60K 17/354* (2006.01)
  *B60W 10/10* (2012.01)
  *B60W 10/02* (2006.01)
  *B60W 30/18* (2012.01)

(52) U.S. Cl.
  CPC ............ *B60K 6/52* (2013.01); *B60K 17/354* (2013.01); *B60K 26/04* (2013.01); *B60W 10/06* (2013.01); *B60W 10/08* (2013.01); *B60W 10/10* (2013.01); *B60K 2026/043* (2013.01); *B60K 2026/046* (2013.01); *B60W 10/02* (2013.01); *B60W 30/18* (2013.01); *B60W 2300/405* (2013.01); *B60W 2540/10* (2013.01); *B60W 2540/16* (2013.01); *B60Y 2200/86* (2013.01); *Y02T 10/6221* (2013.01); *Y02T 10/6243* (2013.01); *Y02T 10/6265* (2013.01); *Y02T 10/6286* (2013.01); *Y10S 903/93* (2013.01)

(56) References Cited

U.S. PATENT DOCUMENTS

| | | | | |
|---|---|---|---|---|
| 6,595,308 B2 * | 7/2003 | Bowen | ............... | B60K 1/00 180/65.235 |
| 6,629,026 B1 * | 9/2003 | Baraszu | ............... | B60K 6/48 180/65.25 |
| 7,467,678 B2 * | 12/2008 | Tanaka | ............... | B60K 6/445 180/248 |
| 2003/0019674 A1 * | 1/2003 | Duan | ............... | B60K 6/44 180/65.225 |
| 2003/0078134 A1 * | 4/2003 | Kojima | ............... | B60K 6/365 477/3 |
| 2004/0050599 A1 * | 3/2004 | Krzesicki | ............... | B60K 6/44 180/65.225 |
| 2004/0082433 A1 * | 4/2004 | Williams | ............... | B60K 6/38 477/5 |
| 2004/0163862 A1 * | 8/2004 | Yamaguchi | ............... | B60K 6/48 180/65.25 |
| 2008/0223633 A1 * | 9/2008 | Kim | ............... | B60K 6/48 180/65.265 |
| 2009/0008168 A1 * | 1/2009 | Yamanaka | ............... | B60K 6/445 180/65.245 |
| 2009/0062063 A1 * | 3/2009 | Yamanaka | ............... | B60K 6/445 477/5 |

OTHER PUBLICATIONS

International Search Report dated Jul. 11, 2013 for International application No. PCT/US2013/022175.
Written Opinion of the International Searching Authority dated Jul. 11, 2013 or International application No. PCT/US2013/022175.

* cited by examiner

UTILITY VEHICLE WITH PARALLEL OPERATED INTERNAL COMBUSTION ENGINE AND ELECTRIC MOTOR DRIVETRAINS

CROSS REFERENCE TO RELATED APPLICATIONS

This application is a divisional of U.S. patent application Ser. No. 13/405,805 filed on Feb. 27, 2012, which claims the benefit of U.S. Provisional Application No. 61/588,880 filed on Jan. 20, 2012. The disclosures of the above applications are incorporated herein by reference in their entirety.

FIELD

The present application relates to hybrid utility vehicles having an electric motor and an internal combustion engine drivetrains that can operate separately and in parallel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Utility vehicles, such as maintenance vehicles, cargo vehicles, shuttle vehicles, and golf cars include one primary mover, such as an electric motor or an internal combustion engine. Torque output by the primary mover drives two or more wheels of the vehicle to propel the vehicle. A control module may control operation of the vehicle based on one or more driver inputs.

SUMMARY

A utility vehicle includes a first axle, a second axle, an electric motor, an internal combustion engine, and a torque transfer device. The first axle is coupled to first and second wheels. The second axle is coupled to third and fourth wheels. The electric motor drives the first axle in a first direction and a second direction at different times. The internal combustion engine drives a transmission output shaft in one direction. The torque transfer device selectively drives the second axle in the first direction in response to rotation of the transmission output shaft in the one direction. The torque transfer device also selectively drives the second axle in the second direction in response to rotation of the transmission output shaft in the one direction.

In other features, a method includes driving a first axle in a first direction and in a second direction at different times using an electric motor. The first axle is coupled to first and second wheels of a vehicle. The method also includes driving an output shaft of a transmission in one direction using an internal combustion engine. The method also includes selectively driving a second axle in the first direction in response to rotation of the transmission output shaft in the one direction using a torque transfer device. At another time, the method also includes selectively driving the second axle in the second direction in response to rotation of the transmission output shaft in the one direction using the torque transfer device. The second axle is coupled to third and fourth wheels of the vehicle.

In still other features, a utility vehicle includes an internal combustion engine, an electric motor, an accelerator pedal, a position sensor, a motor control module, and a throttle linkage. The internal combustion engine drives a first set of wheels. The electric motor drives a second set of wheels. The first and second sets are different. The position sensor measures a position of the accelerator pedal. The motor control module controls the electric motor based on the measured position. The throttle linkage mechanically connects the accelerator pedal to a throttle valve of the internal combustion engine. The throttle linkage actuates the throttle valve as the accelerator pedal is actuated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
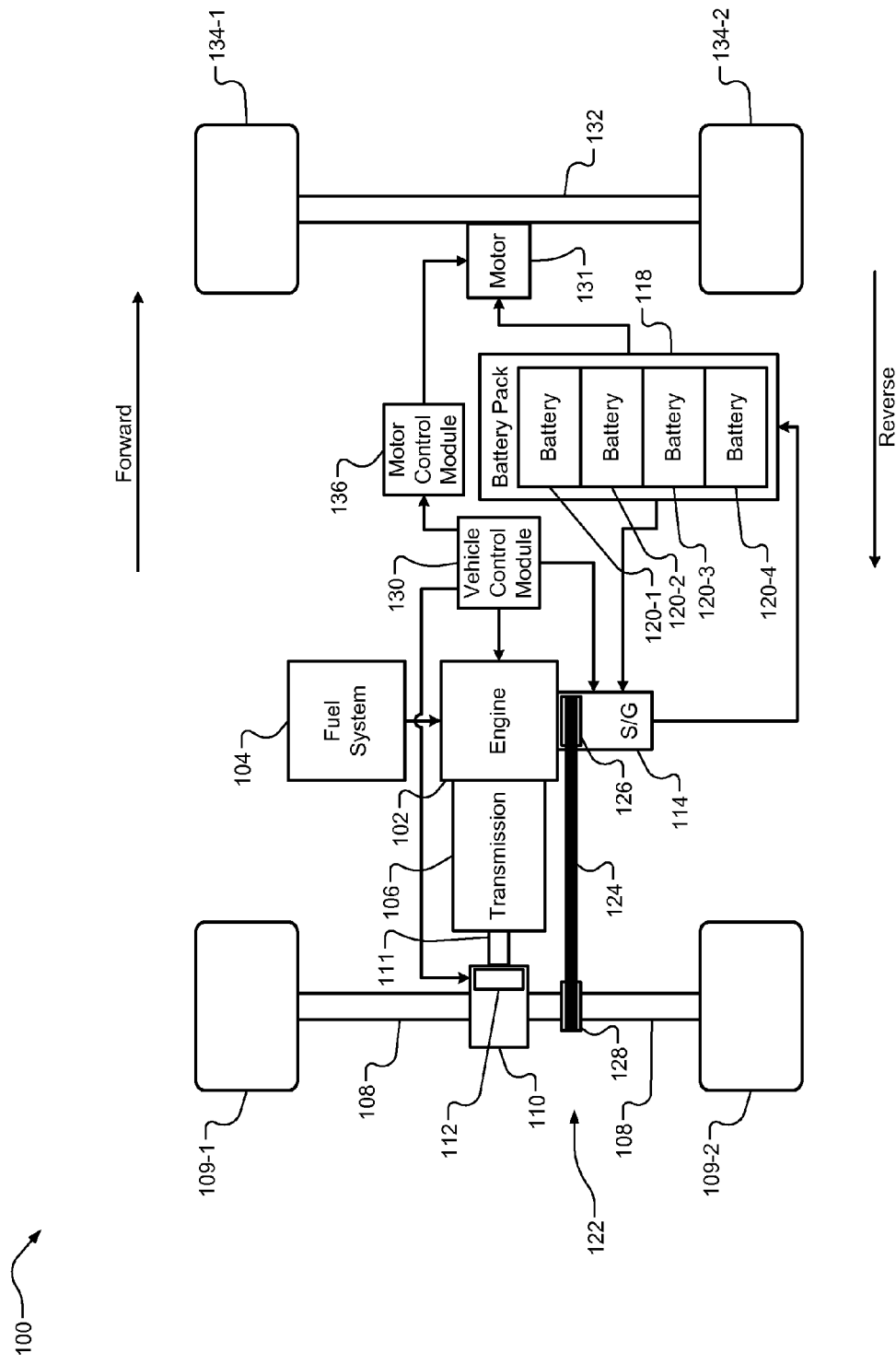
FIG. 1 is a functional block diagram of an example vehicle system according to the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of an example vehicle system is presented. A utility vehicle 100 includes an internal combustion engine 102 that combusts an air/fuel mixture within one or more cylinders (not shown). For example only, the vehicle 100 may be a maintenance vehicle, a cargo vehicle, a shuttle vehicle, a golf car, or another suitable type of utility vehicle that is not designated for use on roadways.

A fuel system 104 provides fuel to the engine 102. Combustion of the air/fuel mixture within the engine 102 generates torque. The fuel may be, for example, gasoline, diesel fuel, or another suitable type of fuel. The engine 102 outputs torque to a transmission 106. For example only, the transmission 106 may include a continuously variable transmission (CVT) or another suitable type of transmission. The transmission 106 transfers torque to a rear axle 108 via a torque transfer device 110. Specifically, the transmission 106 outputs torque to the torque transfer device 110 via a transmission output shaft 111. When transferring torque output by the engine 102 to the torque transfer device 110, the transmission output shaft 111 rotates in only one direction.

The torque transfer device 110 includes a shift actuator 112 that regulates operation of the torque transfer device 110 in one of three modes: a forward mode; a reverse mode; and a neutral mode. When the torque transfer device 110 is in the forward mode, rotation of the transmission output shaft 111 in the one direction drives the rear axle 108 to propel the vehicle 100 in a forward direction. When the torque transfer device 110 is in the reverse mode, rotation of the transmission output shaft 111 in the one direction drives the rear axle 108 to propel the vehicle 100 in a reverse direction (opposite of the forward direction). When the torque transfer device 110 is in the neutral mode, the transmission 106 and the rear axle 108 are de-coupled, and torque output by the transmission 106 is not transferred to the rear axle 108. The rear axle 108 drives one or more rear wheels, such as rear wheels 109-1 and 109-2 (hereafter "rear wheels 109"). Alternatively, the transmission 106 could effect forward, neutral, and reverse operation.

A starter/generator unit 114 selectively cranks and starts the engine 102. A starter solenoid (not shown in FIG. 1) selectively engages the starter/generator unit 114 with the engine 102 (e.g., with a flywheel, not shown). The starter/generator unit 114 draws electrical power from a battery pack 118 to crank and start the engine 102. The battery pack 118 may include a plurality of individual batteries, such as batteries 120-1, 120-2, 120-3, and 120-4, connected in series. Each of the batteries 120-1, 120-2, 120-3, and 120-4 may be approximately 12 Volt (V) batteries such that the battery pack 118 provides approximately 48 V. A greater or fewer number of batteries may be included to provide a greater or lesser voltage.

The starter/generator unit 114 may include a one way clutch that allows the starter/generator unit 114 to drive the engine 102, but not vice versa. The starter/generator unit 114 may automatically disengage from the engine 102 once a speed of the engine 102 reaches a predetermined speed during starting of the engine 102.

The starter/generator unit 114 is coupled to the rear axle 108 via a secondary rear drive system 122. For example only, the starter/generator unit 114 may be coupled to the rear axle 108 by a belt 124 or a chain. The belt 124 may encircle a starter pulley 126 and an axle pulley 128. The starter pulley 126 is coupled to and rotates with a drive/driven shaft (not shown) of the starter/generator unit 114. The axle pulley 128 is coupled to and rotates with the rear axle 108.

When the starter/generator unit 114 is disengaged from the engine 102, the starter/generator unit 114 can impose a torque load on the engine 102 (via the rear axle 108) to generate electrical power and charge the battery pack 118. In other words, the starter/generator unit 114 converts mechanical energy output by the engine 102 into electrical power. The starter/generator unit 114 outputs electrical power at approximately 48 V, the same voltage as the battery pack 118.

When the starter/generator unit 114 is disengaged from the engine 102, the starter/generator unit 114 can also directly drive the rear axle 108 using electrical power from the battery pack 118 when the torque transfer device 110 is in the neutral mode. This feature may allow the vehicle 100 to be operated in an all-electric four-wheel drive mode.

A vehicle control module 130 controls the mode of operation of the torque transfer device 110 via the shift actuator 112. The vehicle control module 130 controls operation of the starter generator unit 114. More specifically, the vehicle control module 130 controls cranking/starting of the engine 102 via the starter/generator unit 114. The vehicle control module 130 may also control charging of the battery pack 118 via the starter/generator unit 114. The vehicle control module 130 may also control operation of the starter/generator unit 114, for example, for operation in the all-electric four-wheel drive mode.

The vehicle 100 also includes an electric motor 131. The motor 131 can be, for example, an alternating current (AC) motor, a direct current (DC) motor, an induction motor, a brushless motor, a brush-based motor, or another suitable type of electric motor. The motor 131 draws electrical power from the battery pack 118 and drives a front axle 132. The front axle 132 drives one or more front wheels, such as front wheels 134-1 and 134-2 (hereafter "front wheels 134"). In various implementations, more than one electric motor may be provided, and the motors may directly drive the front wheels 134. A motor control module 136 controls operation of the motor 131. The motor control module 136 also controls whether the motor 131 drives the front axle 132 to propel the vehicle 100 in the forward direction or drives the front axle 132 to propel the vehicle 100 in the reverse direction. The motor control module 136 controls the motor 131 based on signals from the vehicle control module 130 and/or one or more other signals.

The motor 131 may be capable of outputting a greater amount of torque than the engine 102. Additionally, a magnitude of sound (e.g., in decibels) produced by operation of the motor 131 is less than a magnitude of sound produced during operation of the engine 102. However, the engine 102 may be capable of achieving greater speeds than the motor 131. Additionally, a range of the vehicle 100 (e.g., a maximum distance traveled) when operated using only the engine 102 may be greater than a range of the vehicle 100 when operated only using the motor 131.

According to the present disclosure, in response to a user's selection, the vehicle 100 can be propelled in the forward direction or the reverse direction using only torque output by the motor 131. The vehicle 100 can also be propelled in the forward direction or the reverse direction using only torque output by the engine 102. The vehicle 100 can also be propelled in the forward direction or the reverse direction using a combination of torque output by the motor 131 and the engine 102. When a combination of torque output by the motor 131 and the engine 102 is used, the motor 131 and the engine 102 may be controlled in tandem to best utilize the greater torque output capability and the quieter operation of the motor 131 with the greater speed capability and greater range of the engine 102.

Figure 2:
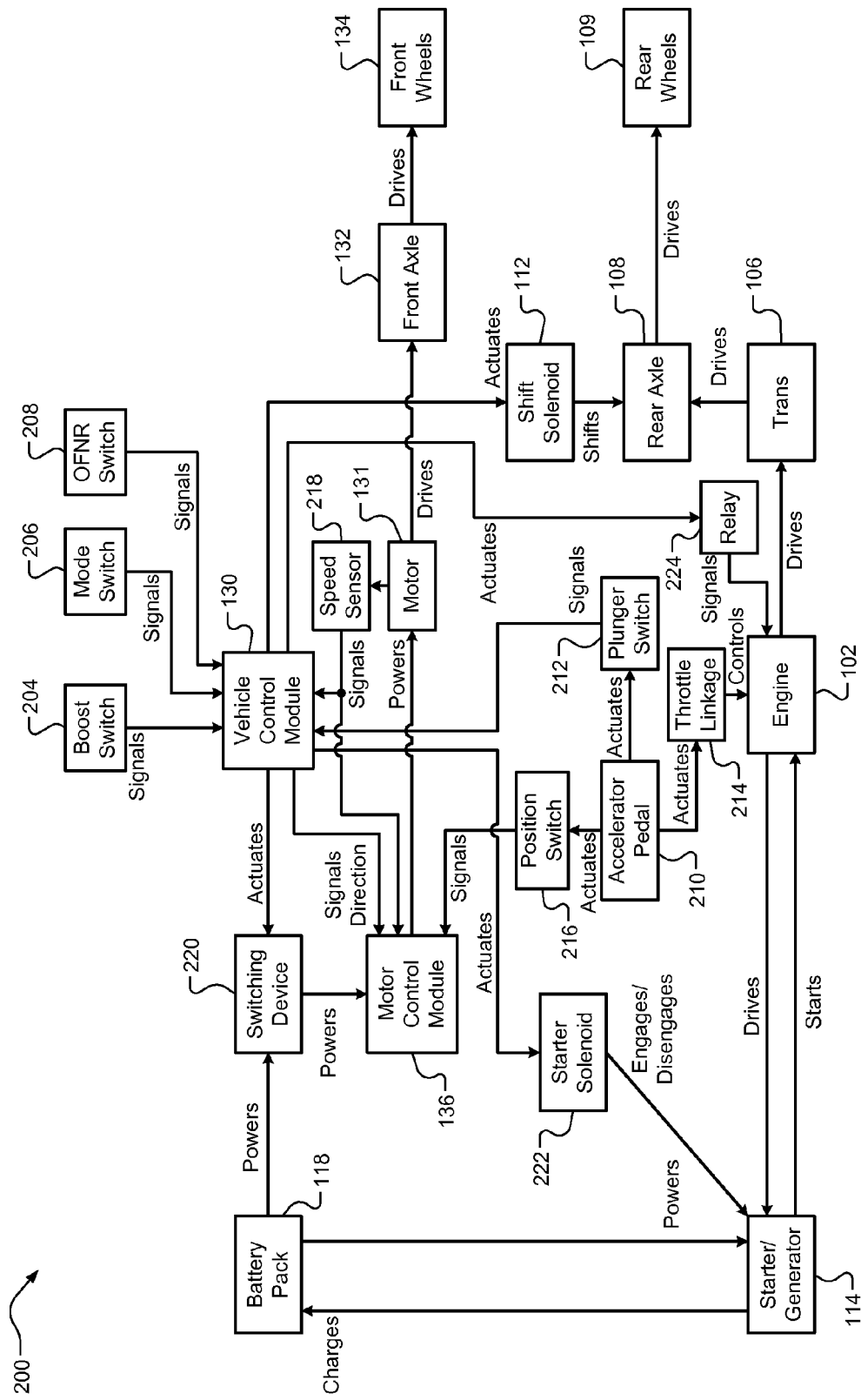
FIG. 2 is a functional block diagram of an example vehicle control system according to the present disclosure.

Referring now to FIG. 2, a functional block diagram of a vehicle control system 200 is presented. A user controls operation of the vehicle 100 using input devices, such as an electric boost switch 204, a mode switch 206, an OFF/forward/neutral/reverse (OFNR) switch 208, and an accelerator pedal 210.

A user selects one of an OFF mode, a forward mode, a neutral mode, or a reverse mode at a given time using the OFNR switch 208. The OFNR switch 208 outputs a signal to the vehicle control module 130 that indicates whether the OFF mode, the forward mode, the neutral mode, or the reverse mode is selected.

The motor 131 and the engine 102 are both maintained OFF when the OFF mode is selected. When the forward mode is selected, the vehicle 100 is selectively propelled in the forward direction based on actuation of the accelerator pedal 210. When the reverse mode is selected, the vehicle 100 is selectively propelled in the reverse direction based on actuation of the accelerator pedal 210. When the forward mode or the reverse mode is selected, operation of the motor 131 and/or the engine 102 is controlled based on a selection input via the mode switch 206. When the neutral mode is selected, torque is not transferred from the motor 131 to the front axle 132, and torque is not transferred from the transmission 106 to the rear axle 108.

A user selects one of an electric mode, a both mode, or an engine (e.g., gasoline) mode at a given time using the mode switch 206. The mode switch 206 outputs a signal to the vehicle control module 130 that indicates whether the electric mode, the both mode, or the engine mode is selected.

When the electric mode is selected, the engine 102 is maintained OFF, and the motor 131 may be operated to output torque to the front axle 132. When the both mode is selected, the engine 102 may be operated to output torque to the rear axle 108, and the motor 131 may be operated to output torque to the front axle 132. When the engine mode is selected, the engine 102 may be operated to output torque to the rear axle 108, and the motor 131 may be maintained OFF.

A user selectively activates an electric boost by depressing the boost switch 204 during operation in the engine mode. When the engine mode is selected and a user activates an electric boost by depressing the boost switch 204, the engine 102 may be operated to output torque to the rear axle 108 as described above, and the motor 131 may additionally be operated to output torque to the front axle 132.

A user actuates (e.g., depresses and releases) an accelerator pedal 21 to control torque to the front and/or rear axles 132 and 108. User actuation of the accelerator pedal 210 from a resting position may actuate a plunger switch 212. The plunger switch 212 outputs a signal to the vehicle control module 130 indicating that the accelerator pedal 210 is depressed relative to the resting position. The vehicle control module 130 selectively engages the starter generator unit 114 with the engine 102 to start the engine via the starter solenoid 222. When the starter/generator unit 114 is engaged with the engine 102, the vehicle control module 130 may control the application of power to the starter/generator unit 114 to crank and start the engine 102.

Actuation of the accelerator pedal 210 may also actuate a throttle linkage 214. The throttle linkage 214 may regulate airflow into the engine 102 (e.g., via opening of a throttle valve) and fueling to the engine 102 when the engine 102 is ON. In this manner, actuation of the accelerator pedal 210 controls torque output by the engine 102 while the engine 102 is ON.

Actuation of the accelerator pedal 210 also actuates a position switch 216. The position switch 216 outputs a signal to the motor control module 136 based on the position of the accelerator pedal 210. The motor control module 136 may control a speed of the motor 131 based on the position of the accelerator pedal 210. For example only, the motor control module 136 may increase the speed of the motor 131 as the amount of depression of the accelerator pedal 210 relative to the resting position increases.

A speed sensor 218 may be implemented to measure a speed of the motor 131 and output a signal to the motor control module 136 and/or the vehicle control module 130 that is indicative of the measured speed. The motor control module 136 may use the measured speed of the motor 131 as feedback for controlling the motor 131. The vehicle control module 130 may use the measured speed to determine, for example, whether the torque transfer device 110 can be engaged without damaging the rear axle 108.

The vehicle 100 may also include an engine killing relay 224. The vehicle control module 130 selectively actuates the relay 224 to enable operation of the engine 102 at times when the engine 102 is off and to shut down the engine 102 at times when the engine 102 is running.

When the OFF mode is selected via the OFNR switch 208, the vehicle control module 130 may control a switching device 220 such the motor control module 136 is not powered. When one of the forward mode, the reverse mode, and the neutral mode is selected via the OFNR switch 208, the vehicle control module 130 may control the switching device 220 such that the motor control module 136 receives power from the battery pack 118.

The vehicle control module 130 outputs a direction signal to the motor control module 136 that indicates a selected direction. For example, when the forward mode is selected, the vehicle control module 130 sets the direction signal to the forward direction. When the reverse mode is selected, the vehicle control module 130 sets the direction signal to the reverse direction. When the neutral mode is selected, the vehicle control module 130 sets the direction signal to neutral.

Table 1 below summarizes responses of the vehicle control module 130 under steady-state conditions.

TABLE 1

| OFNR Selection | Mode Selection | Drive direction of Motor 131 |
| --- | --- | --- |
| Forward | Electric | Forward |
| Forward | Both | Forward |
| Forward | Engine | — |
| Reverse | Electric | Reverse |
| Reverse | Both | Reverse |
| Reverse | Engine | — |

If the forward mode is selected via the OFNR switch 208 and the electric mode or the both mode is selected via the mode switch 206, the vehicle control module 130 sets the direction signal to the forward direction, and the motor control module 136 selectively operates the motor 131 to drive the front axle 132 in the forward direction. If the reverse mode is selected via the OFNR switch 208 and the electric mode or the both mode is selected via the mode switch 206, the vehicle control module 130 sets the direction signal to the reverse direction, and the motor control module 136 selectively operates the motor 131 to drive the front axle 132 in the reverse direction. If the engine mode is selected via the mode switch 206, the motor control module 136 may maintain the motor 131 OFF such that the motor 131 free wheels.

Table 2 below summarizes responses to depression of the boost switch 204 under various circumstances.

TABLE 2

| OFNR Selection | Mode Selection | Boost Switch Pressed | Drive direction of Motor 131 |
|---|---|---|---|
| Forward | Electric | — | Forward |
| Forward | Both | — | Forward |
| Forward | Engine | Electric on | Forward |
| Reverse | Electric | — | Reverse |
| Reverse | Both | — | Reverse |
| Reverse | Engine | Electric on | Reverse |

If the neutral mode is selected via the OFNR switch 208, the motor control module 136 may maintain the motor 131 OFF regardless of the mode selected via the mode switch 206. If the engine mode is selected via the mode switch 206, the motor control module 136 operates the motor 131 in the direction indicated by the direction signal in response to the boost switch 204 being pressed. If the electric mode is selected via the mode switch 206, no action may be taken in response to depression of the boost switch 204. No response may be taken because the motor 131 is already being operated in the direction indicated when the electric mode is selected.

Table 3 below summarizes how the vehicle control module 130 positions the shift solenoid 112 under steady-state conditions. As described above, the shift solenoid 112 controls whether the transmission output shaft 111 drives the rear axle 108 and, if the transmission output shaft 111 is driving the rear axle 108, the direction in which the transmission output shaft 111 drives the rear axle 108.

TABLE 3

| OFNR Selection | Mode Selection | Shift Actuator |
|---|---|---|
| Forward | Electric | Neutral |
| Forward | Both | Forward |
| Forward | Engine | Forward |
| Reverse | Electric | Neutral |
| Reverse | Both | Reverse |
| Reverse | Engine | Reverse |

If the forward mode is selected via the OFNR switch 208 and the both mode or the engine mode is selected via the mode switch 206, the vehicle control module 130 actuates the shift solenoid 112 such that the transmission output shaft 111 drives the rear axle 108 in the forward direction. If the reverse mode is selected via the OFNR switch 208 and the both mode or the engine mode is selected via the mode switch 206, the vehicle control module 130 actuates the shift solenoid 112 such that the transmission output shaft 111 drives the rear axle 108 in the reverse direction. If the electric mode is selected via the mode switch 206, the vehicle control module 130 actuates the shift solenoid 112 to a neutral state such that torque is not transferred between the rear axle 108 and the transmission output shaft 111.

Table 4 below summarizes how the vehicle control module 130 actuates the shift solenoid 112 under various circumstances while the vehicle 100 is in motion.

TABLE 4

| Current Mode | Requested Mode | Current Direction | Requested Direction | OK to Shift Based on Speed? | Actuator | Electric Direction |
|---|---|---|---|---|---|---|
| Electric | Electric | F | N | Ok | N | F to N |
| | | | R | Ok | N | F to R |
| | | N | F | Ok | N | N to F |
| | | | R | Ok | N | N to R |
| | | R | N | Ok | N | R to N |
| | | | F | Ok | N | R to F |
| Engine or Both | Engine or Both | F | N | Yes | F to N | F to N |
| | | | | No | F to N | F to N |
| Engine or Both | Engine or Both | N | F | Yes | N to F | N |
| | | | | No | N | N |
| Engine or Both | Engine or Both | N | R | Yes | N to R | N to R |
| | | | | No | N | N |
| Engine or Both | Engine or Both | R | N | Yes | R to N | R to N |
| | | | | No | R to N | R to N |
| Engine or Both | Engine or Both | F | R | Yes | F to R | F to R |
| | | | | No | F | F |
| Engine or Both | Engine or Both | R | F | Yes | R to F | R to F |
| | | | | No | R | R |
| Engine or Both | Electric | F | F | Ok | F to N | F |
| | | N | N | Ok | N | N |
| | | R | R | Ok | R to N | R |
| Electric | Engine or Both | F | F | Yes | N to F | F |
| | | | | No | N | F |
| Electric | Engine or Both | N | N | Yes | N | N |
| | | | | No | N | N |
| Electric | Engine or Both | R | R | Yes | N to R | R |
| | | | | No | N | R |

N means Neutral, R means Reverse, and F means Forward.

The above is illustrative of a safety interlock feature provided by the vehicle control module 130 that prevent damage from being done to one or more components, such as the transmission 106, the rear axle 108, the shift solenoid 112, the engine 102, etc. For example, when travelling in the forward direction with the both mode via the engine 102 and the motor 131, the vehicle control module 130 may shift the shift solenoid 112 from forward to neutral and disable the engine 102. The motor 131 may continue to drive the vehicle 100 in the forward direction. In this manner, the vehicle can be shifted on the fly from operation of the engine 102 (which may produce some noise) to operation with only the motor 131 (which may be silent or relatively silent). This ability may be important to a customer. Once the shift solenoid 112 is in neutral, the vehicle control module 130 may not shift the shift solenoid 112 again until the vehicle 100 comes to a stop.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A utility vehicle comprising:
   an internal combustion engine that drives a first set of wheels;
   an electric motor that drives a second set of wheels, wherein the first and second sets of wheels are different;
   an accelerator pedal;
   a position sensor that measures a position of the accelerator pedal;
   a motor control module that controls the electric motor based on the measured position of the accelerator pedal;
   a throttle linkage that mechanically connects the accelerator pedal to a throttle valve of the internal combustion engine and that actuates the throttle valve as the accelerator pedal is actuated;

a starter/generator unit;

a battery pack electrically connected to the starter/generator unit;

a first axle structured and operable to drive the first set of wheels;

an axle pulley that is attached to the first axle and rotates with the first axle;

a starter pulley that is attached to a shaft of the starter/generator unit and rotates with the shaft of the starter/generator unit; and a coupling device structured and operable to drive the starter pulley, starter shaft and starter/generator unit in response to rotation of the first axle and axle pulley generated via torque output by the internal combustion engine such that the starter/generator unit generates electrical power for charging the battery pack.

2. The utility vehicle of claim 1 further comprising:

a transmission that is structured and operable to receive torque output by the engine and to drive a transmission output shaft in one direction;

a torque transfer device structured and operable to selectively drive the first axle in a first direction and in a second direction in response to rotation of the transmission output shaft in the one direction, wherein the first and second directions are different.

3. The utility vehicle of claim 2 further comprising a starter solenoid structured and operable to selectively engage the starter/generator unit with the internal combustion engine to start the internal combustion engine, wherein the torque transfer device is further structured and operable to selectively decouple the transmission output shaft from the first axle, and wherein the starter/generator unit is structured and operable to selectively rotate the starter pulley in response to a determination that the transmission output shaft is decoupled from the first axle and that the starter/generator unit is disengaged from the internal combustion engine, and wherein the coupling device is further structured and operable to drive the axle pulley and first axle in response to rotation of the starter pulley generated via torque output by the starter/generator unit such that the first axle is driven via the starter/generator unit.

4. The utility vehicle of claim 2 further comprising:

a switch structured and operable to output a signal indicating one of the first direction and the second direction;

a vehicle control module structured and operable:

to selectively actuate a shift actuator such that the torque transfer device drives the first axle in the one of the first and second directions indicated by the signal in response to rotation of the transmission output shaft in the one direction; and a motor control module structured and operable to selectively operate the electric motor to drive the second set of wheels based on the one of the first and second directions indicated by the signal.

5. The utility vehicle of claim 4 further comprising:

a second switch structured and operable to output a second signal indicating one of operation of only the electric motor, operation of only the internal combustion engine, and operation of both the electric motor and the internal combustion engine, wherein the motor control module is further structured and operable to:

control the electric motor based on the second signal, and control operation of the internal combustion engine based on the second signal.

6. The utility vehicle of claim 5 wherein:

in response to the second signal indicating operation of only the electric motor, the motor control module is structured and operable to control operation of the electric motor and disable the internal combustion engine;

in response to the second signal indicating operation of only the internal combustion engine, the motor control module is structured and operable to disable the electric motor and control operation of the internal combustion engine; and in response to the second signal indicating operation of both the electric motor and the internal combustion engine, the motor control module is structured and operable to control operation of the electric motor and the operation of the internal combustion engine.

7. The utility vehicle of claim 6 further comprising a third switch structured and operable to output a third signal in response to actuation of the third switch, wherein, in response to the output of the third signal while the second signal indicates operation of only the internal combustion engine, the motor control module is structured and operable to control operation of the electric motor.

8. A method for charging a battery bank of utility vehicle, said method comprising:

rotating an axle of a utility vehicle and an axle pulley attached to the axle, via torque generated by an internal combustion engine of the vehicle;

rotating a starter pulley attached to a shaft of a starter/generator unit of the vehicle, via torque generated by rotation of the axle and a coupling device operably connected to both the axle pulley and the starter pulley; and rotating the starter/generator shaft, via rotation of the starter pulley, such that the starter/generator unit generates electrical power for charging a battery pack of the vehicle utilizing the torque generated by rotation of the axle.

* * * * *